H. MATTSON.
WEED DESTROYER.
APPLICATION FILED MAR. 13, 1919.
1,313,310.
Patented Aug. 19, 1919.
2 SHEETS—SHEET 2.
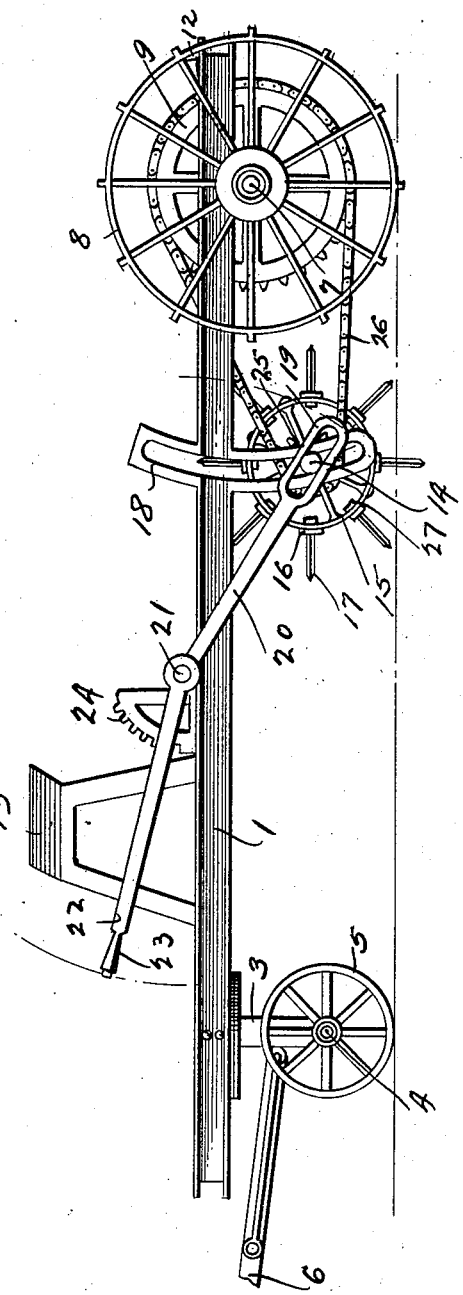
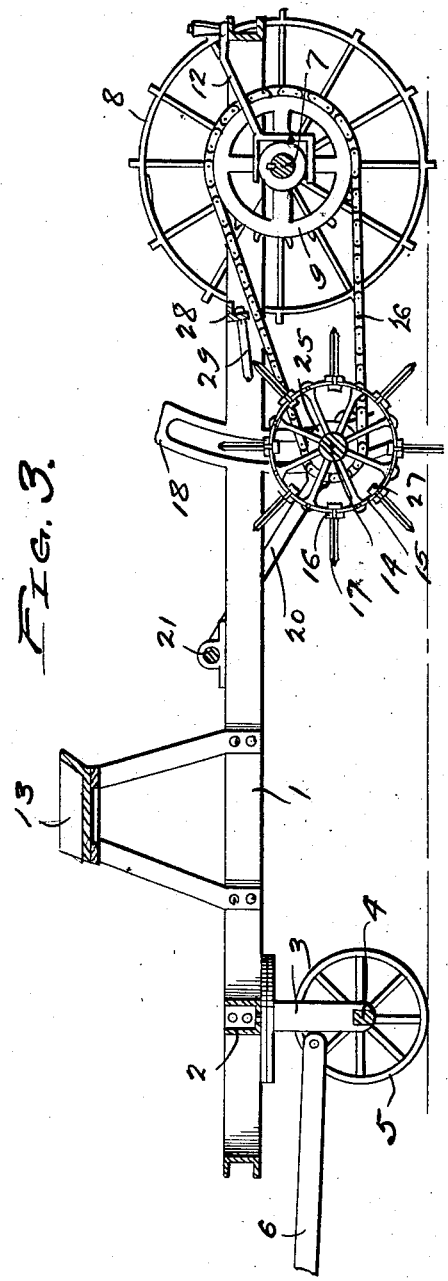
WITNESSES
G. W. Walling
U. B. Hillyard.
INVENTOR.
Henry Mattson
BY
Richard Belliveau
ATTORNEY.

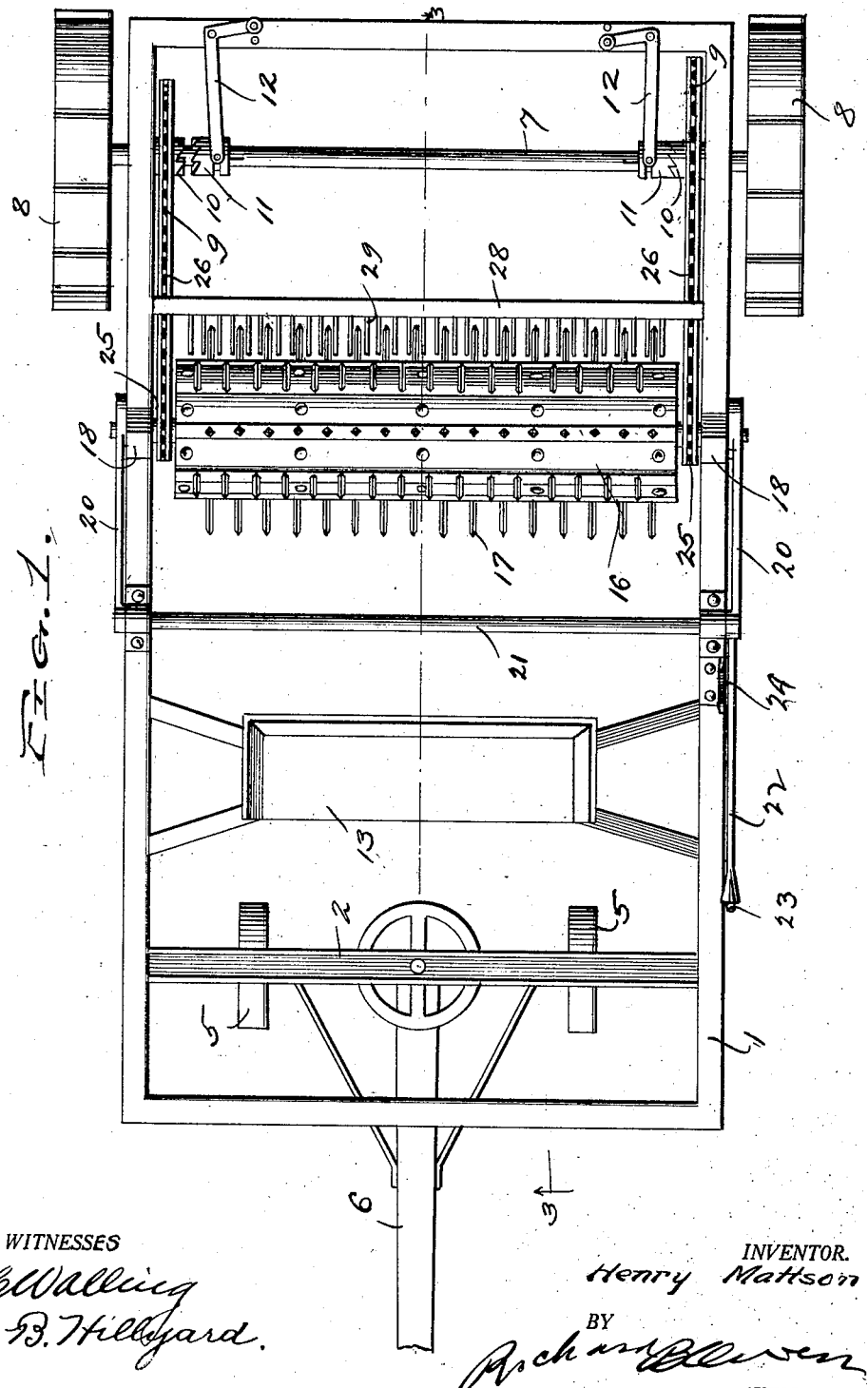

UNITED STATES PATENT OFFICE.

HENRY MATTSON, OF HANSBORO, NORTH DAKOTA.

WEED-DESTROYER.

1,313,310.  Specification of Letters Patent.  Patented Aug. 19, 1919.

Application filed March 13, 1919. Serial No. 282,280.

*To all whom it may concern:*

Be it known that I, HENRY MATTSON, a citizen of the United States, residing at Hansboro, in the county of Towner and State of North Dakota, have invented certain new and useful Improvements in Weed-Destroyers, of which the following is a specification.

The invention relates to machinery for preparing the soil for sowing seed or for raising a crop of any nature, the purpose being to exterminate white grass, weeds, and other objectionable growths which detract from the fertility of soil and result in a diminished harvest.

The invention consists of an implement embodying a toothed roller of such construction as to insure the killing of quick or white grass and weeds, said roller being driven at such relative speed as to insure the killing of the weeds and thereby preventing the sapping of the soil by such plants.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

In the drawings hereto attached,

Figure 1 is a top plan view of a weeder embodying the invention.

Fig. 2 is a side view.

Fig. 3 is a longitudinal section on the line 3—3 of Fig. 1.

Corresponding and like parts are referred to in the following description and indicated in the several views of the drawings by like reference characters.

The machine embodies a main frame 1 which as illustrated is of rectangular form and preferably constructed of angle iron of U form in cross section. A cross beam 2 is provided near the front end of the frame and has a wheel frame 3 pivotally connected thereto so as to admit of proper steering. A front axle 4 is supported by the wheel frame 3 and is provided at its ends with ground wheels 5. A pole or tongue 6 is connected to the wheel frame 3 in any usual manner to admit of hitching a team to the machine for drawing the same over the field. A rear axle 7 is mounted upon the rear portion of the main frame and is provided with ground wheels 8 which constitute drivers. Gear wheels 9 are loose upon end portions of the rear axle 7 and are provided upon their inner faces with half clutches 10 which are adapted to coöperate with clutch members 11 splined on the axle 7 and operable by means of bell crank levers 12 which are mounted upon the frame 1. By proper manipulation of the levers 12 one or both clutch members 11 may be thrown into clutched engagement with the gear wheels 9 to cause them to rotate through the axle 7. A driver's seat 13 is provided upon the front portion of the frame 1 and may be connected thereto in any manner.

The weeder proper consists of a toothed roller or drum which is mounted on the frame 1 for vertical adjustment and connected with the gear wheels 9 to be driven from the axle 7 by means of the drive wheels 8. The toothed roller or drum comprises a shaft 14, spider supports 15 mounted upon the shaft 14 to rotate therewith, a plurality of slats or strips 16 secured to the spiders 15 and teeth 17 applied to the slats or strips 16. The weeder is mounted to admit of its vertical adjustment and for this purpose the ends of the shaft 14 are mounted in curved bars 18 at the sides of the frame 1 and preferably forming an integral part of the frame. The curved bars 18 are concentric with the axle 7 and are slotted to receive the ends of the shaft 14 which project beyond the bars 18 to engage the longitudinally slotted ends 19 of arms 20 which project from a shaft 21 mounted in bearings on the side members of the frame 1. A lever 22 projects from the shaft 21 within convenient reach of the driver's seat and is provided with the usual hand latch 23 which coöperates with a toothed segment 24 to hold the shaft 21 and the toothed roller in the required adjusted position. Pinions 25 are secured to end portions of the shaft 14 and drive chains 26 connect the pinions 25 with the gear wheels 9. The teeth 17 have their shanks threaded so as to make detachable connection with the slats or strips 16, the threaded ends projecting beyond the inner sides of the slats 16 receiving nuts 27 by means of which the teeth 17 are retained in place.

A cleaner is disposed to coöperate with the rotary weeder and comprises a cross bar 28 and teeth 29 carried by the cross bar and disposed to come between the teeth 17 of the roller or drum. The cross bar 28 is of L form and one of the wings receives the teeth 29 which are detachably connected thereto in any manner to admit of ready replacement.

As the implement is drawn over the field the shaft 7 is rotated by means of the drive wheels 8. When the implement is traveling in a straight line both clutch members 11 are thrown into engagement with the clutch teeth 10 of the gear wheel 9. When making a turn one of the clutch members 11 is thrown out of engagement with the coöperating gear wheel 9 and the other clutch member is thrown into engagement with the coöperating gear wheel on the side making the larger turn. By reason of the difference in the diameters of the gear wheels 9 and pinions 25 the toothed roller or drum is caused to rotate faster than the axle 7, hence the teeth 17 engage and uproot the weeds and other objectionable growths, thereby eradicating and exterminating the same. The depth of action of the teeth 17 may be regulated by proper adjustment of the lever 22 and when moving the machine from one place to another the toothed roller or drum may be thrown out of operation by elevating the same so as to clear the surface of the ground.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a weed exterminator, a main frame, a rotary weeder mounted on the main frame and adapted to be adjusted vertically and including a shaft, a transverse shaft, arms projecting from the shaft and having slotted portions for receiving the shaft of the rotary weeder, an operating lever connected with the transverse shaft, and means for holding the operating lever in adjusted positions.

2. In a weed exterminator, a main frame, guides on the main frame, a weeder mounted in the guides and movable vertically therein, a shaft mounted on the frame, arms projecting from the shaft and having slotted portions to engage opposite end portions of the weeder to effect vertical adjustment thereof and means for turning the shaft and holding it in adjusted positions.

3. In a weed exterminator, a main frame, curved guides on the frame, a drive axle concentric with the curved guides, a rotary weeder mounted in the curved guides, means positively connecting the weeder with the drive axle, a shaft mounted on the frame forwardly of the curved guides, arms projecting from the shaft and having slotted portions engaging the journals of the rotary weeder, and means for rotating the shaft and holding it in adjusted positions.

In testimony whereof I affix my signature in presence of two witnesses.

HENRY MATTSON.

Witnesses:
A. S. McLean,
F. A. Foley.

Copies of this patent may be obtained for five cents each, by addressing the "Commissioner of Patents, Washington, D. C."